United States Patent
Ling et al.

(10) Patent No.: US 9,573,114 B2
(45) Date of Patent: Feb. 21, 2017

(54) TUNE THE OXYGEN STORAGE PROPERTIES OF $CA_2MNALO_{5+\delta}$ THROUGH CHEMICAL DOPING

(71) Applicant: Toyota Motor Engineering & Manufacturing North America, Inc., Erlanger, KY (US)

(72) Inventors: Chen Ling, Ann Arbor, MI (US); Ruigang Zhang, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 320 days.

(21) Appl. No.: 14/517,283

(22) Filed: Oct. 17, 2014

(65) Prior Publication Data

US 2016/0107139 A1 Apr. 21, 2016

(51) Int. Cl.
*B01J 20/06* (2006.01)
*B01J 20/04* (2006.01)

(52) U.S. Cl.
CPC .................................. *B01J 20/041* (2013.01)

(58) Field of Classification Search
CPC .................................. B01J 20/06; B01J 20/02
USPC ............................................................ 502/414
See application file for complete search history.

(56) References Cited

U.S. PATENT DOCUMENTS 6,033,632 A 3/2000 Schwartz et al.

FOREIGN PATENT DOCUMENTS

| JP | 2011121829 A | 6/2011 |
|---|---|---|
| JP | 2014012619 A | 1/2014 |

OTHER PUBLICATIONS

Motohashi, Teruki, et al., "Oxygen Storage Capability of Brownmillerite-type Ca2MnAlO5+δ and Its Application to Oxygen Enrichment," Chemistry of Materials, Jan. 15, 2013, ACS Publications.

*Primary Examiner* — Edward Johnson
(74) *Attorney, Agent, or Firm* — Dinsmore & Shohl LLP (57) ABSTRACT

An oxygen storage material including a compound of the formula: $Ca_2MnAlO_{5+\delta}$ wherein $0 \leq \delta \leq 0.5$ wherein the compound includes at least one dopant said dopant selected from alkaline earth ions at the Ca site, trivalent ions at the Al site, and $3d$ transition metal ions at the Mn site wherein the an oxygen release temperature or an oxygen storage temperature is modified in comparison to an un-doped $Ca_2MnAlO_{5+\delta}$ material.

21 Claims, 5 Drawing Sheets

TUNE THE OXYGEN STORAGE PROPERTIES OF CA₂MNALO$_{5+δ}$ THROUGH CHEMICAL DOPING

FIELD OF THE INVENTION

The invention relates to tuned oxygen storage materials and methods for forming tuned oxygen storage materials.

BACKGROUND OF THE INVENTION

Many transition metal oxides may change oxygen stoichiometry with the variation of temperature or oxygen partial pressure. This property leads to the concept of oxygen storage materials (OSM), where large amounts of oxygen can be reversibly stored and released. OSMs have great potential in applications such as three-way catalysts and regulating oxygen pressures for the exact control of redox reactions. In these applications, an efficient OSM should have large oxygen storage capacity, fast release/storage rate, and good stability against thermal or chemical decomposition. Another property that affects the application of OSM is the temperature and pressure for the transition between oxygen rich and poor phases, which must align with the fluctuation of the targeted chemical reactions.

Figure 1:
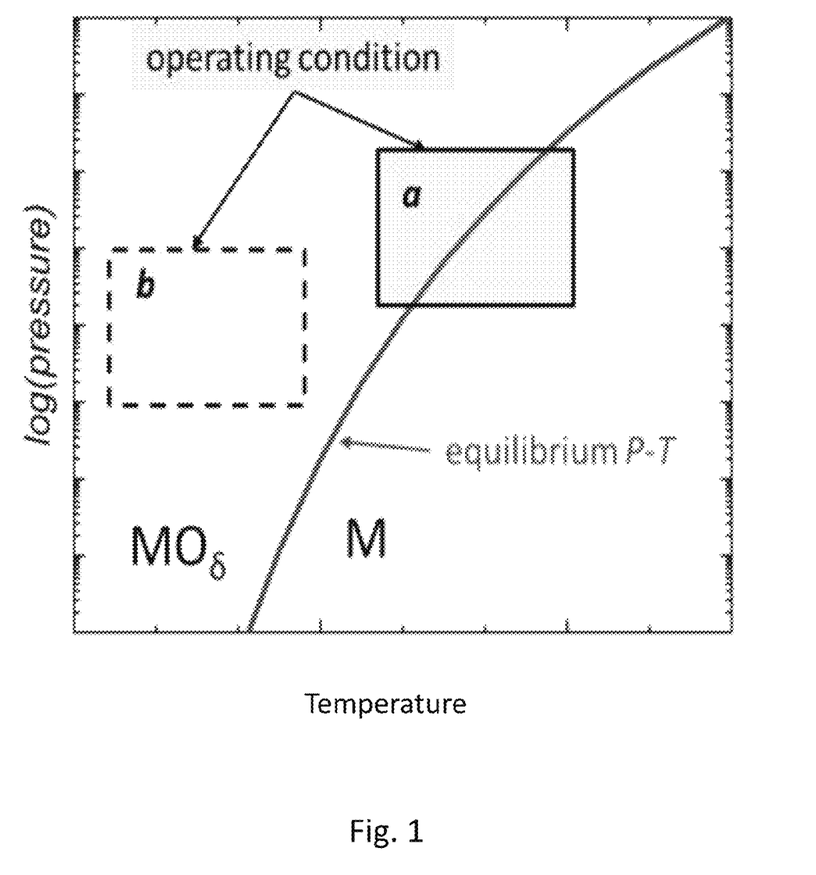
FIG. 1 is a Schematic of the equilibrium between the oxidized phase (MO$_δ$) and reduced phase (M) of an oxygen storage material, and the operating window of the targeted reaction.

For example, as illustrated in FIG. 1, the intake and release of oxygen is determined by the thermodynamic equilibrium between the oxidized (oxygen rich) and reduced (oxygen poor) phase. A desired OSM has its equilibrium pressure-temperature (P-T) curve crossing the window of temperature and pressure where the targeted reaction is operated in order to function in the entire range. Therefore, there is a need in the art to tune the equilibrium P-T curve in order to match the operating conditions for different applications.

Recently, Ca$_2$AlMnO$_5$ with a Brownmillerite-type structure was reported with remarkable capability to store a large amount of excess oxygen. Its oxygen storage capability (2006 μmol/g) is nearly 1.4 times that of the best-known OSM, CeO$_2$—ZrO$_2$ (~1500 μmol/g). In contrast to the case of CeO$_2$—ZrO$_2$, which only releases oxygen under reductive conditions, Ca$_2$AlMnO$_{5+δ}$ is capable to release oxygen even under oxygen-rich atmospheres with high sensitivity to the small variation of temperature. These characteristic features suggest the good potential of Ca$_2$AlMnO$_{5+δ}$ in oxygen-storage technologies. However, Ca$_2$AlMnO$_{5+δ}$ intakes/releases oxygen only in a narrow temperature range between 500 and 700° C., which would limit its application in reactions outside of this temperature window. Therefore, there is a need in the art to tune the intake and release temperatures of Ca$_2$AlMnO$_{5+δ}$ in order to match the operating conditions for different applications.

SUMMARY OF THE INVENTION

In one aspect, there is disclosed an oxygen storage material including a compound of the formula: Ca$_2$MnAlO$_{5+δ}$ wherein 0≤δ≤0.5 wherein the compound includes at least one dopant said dopant selected from alkaline earth ions at the Ca site, trivalent ions at the Al site, and 3d transition metal ions at the Mn site wherein the an oxygen release temperature or an oxygen storage temperature is modified in comparison to an un-doped Ca2MnAlO5$_{+δ}$ material.

In another aspect, there is disclosed an oxygen storage material including a compound of the formula: Ca$_2$MnAlO$_{5+δ}$ wherein 0≤δ≤0.5 wherein the compound includes at least one dopant said dopant selected from alkaline earth ions at the Ca site, trivalent ions at the Al site, and 3d transition metal ions at the Mn site wherein the an oxygen release temperature is increased in comparison to an un-doped Ca$_2$MnAlO$_{5+δ}$ material.

In a further aspect, there is disclosed an oxygen storage material including a compound of the formula: Ca$_2$MnAlO$_{5+δ}$ wherein 0≤δ≤0.5 wherein the compound includes at least one dopant said dopant selected from alkaline earth ions at the Ca site, trivalent ions at the Al site, and 3d transition metal ions at the Mn site wherein the an oxygen release temperature is decreased in comparison to an un-doped Ca2MnAlO5$_{+δ}$ material.

In yet another aspect, there is disclosed an oxygen storage material including a compound of the formula: Ca$_2$MnAlO$_{5+δ}$ wherein 0≤δ≤0.5 wherein the compound includes two dopants said dopants selected from alkaline earth ions at the Ca site, trivalent ions at the Al site, and 3d transition metal ions at the Mn site wherein the an oxygen release temperature or an oxygen storage temperature is modified in comparison to an un-doped Ca2MnAlO5$_{+δ}$ material.

DETAILED DESCRIPTION OF THE PREFERRED EMBODIMENTS

Many transition metal oxides may change oxygen stoichiometry with the variation of temperature or oxygen partial pressure. This property leads to the concept of oxygen storage materials (OSM), where large amounts of oxygen can be reversibly stored and released. OSMs have great potential in applications such as three-way catalysts and regulating oxygen pressures for the exact control of redox reactions. In these applications, an efficient OSM should have large oxygen storage capacity, fast release/storage rate, and good stability against thermal or chemical decomposition. Another property that affects the application of OSM is the temperature and pressure for the transition between oxygen rich and poor phases, which aligns with the fluctuation of the targeted chemical reactions. As illustrated in FIG. 1, the intake and release of oxygen is determined by the thermodynamic equilibrium between the oxidized (oxygen rich) and reduced (oxygen poor) phase. A desired OSM has its equilibrium pressure-temperature (P-T) curve crossing the window of temperature and pressure where the targeted reaction is operated in order to function in the entire range.

Again referring to FIG. 1 there is shown a schematic of the equilibrium between the oxidized phase ($MO_\delta$) and reduced phase (M) of an oxygen storage material, and the operating window of a targeted reaction. In case a, the equilibrium P-T curve crosses the operation window, suggesting the oxygen storage material can function in the entire range. In case b, the equilibrium curve does not cross the operation window, suggesting the oxygen storage material does not have any functionality during the operation. For use in a specific reaction, the equilibrium curve should match the operating parameters of the reaction.

$Ca_2AlMnO_{5+\delta}$ is capable of releasing oxygen even under oxygen-rich atmospheres with high sensitivity to small variation of temperatures. These characteristic features allow the use of $Ca_2AlMnO_{5+\delta}$ in oxygen-storage technologies. However, $Ca_2AlMnO_{5+\delta}$ intakes and releases oxygen only in a narrow temperature range between 500 and 700° C., which would limit its application in reactions outside of this temperature window.

In one aspect, chemical doping may be utilized to tune the properties of functional materials. In one aspect, isoelectronic doping which includes divalent alkaline earth ions doping at Ca site, trivalent $Ga^{3+}$, $Sc^{3+}$ and $Y^{3+}$ ions doping at Al site, and 3d transition metal ions doping at Mn site may be utilized to tune the oxygen storage properties of $Ca_2AlMnO_{5+\delta}$.

In one aspect, there is disclosed an oxygen storage material including a compound of the formula: $Ca_2AlMnO_{5+\delta}$ wherein $0 \leq \delta \leq 0.5$ wherein the compound includes at least one dopant said dopant selected from alkaline earth ions at the Ca site, trivalent ions at the Al site, and 3d transition metal ions at the Mn site wherein the an oxygen release temperature or an oxygen storage temperature is modified in comparison to an un-doped $Ca2MnAlO5_{+\delta}$ material.

Figure 2A:
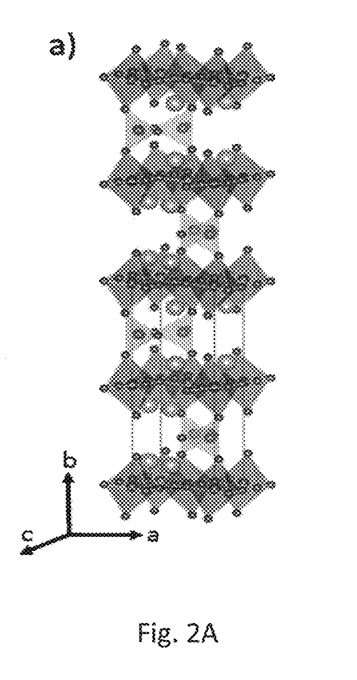
FIG. 2A is a diagram of the Crystal structures of Brownmillerite Ca$_2$MnAlO$_5$ (space group: Ibm2)
Figure 2B:
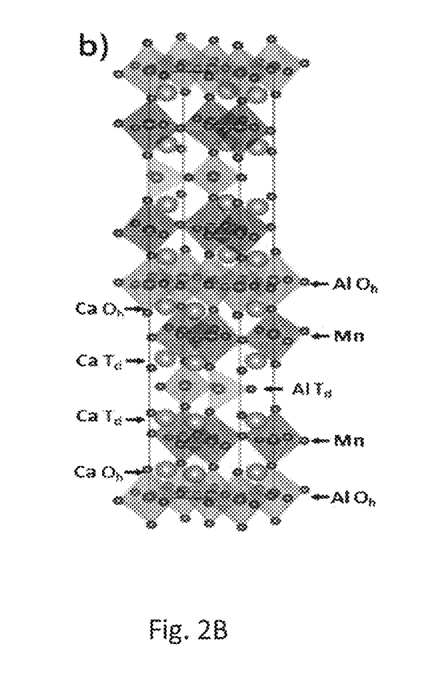
FIG. 2B is a diagram of the Crystal structures of Brownmillerite Ca$_2$MnAlO$_{5.5}$ (space group: Imma)

$Ca_2MnAlO_5$ crystalizes in a Brownmillerite structure, a defect perovskite with ordered oxygen vacancies. The larger Ca ion is located at the perovskite A site, while smaller Mn and Al ions occupy the perovskite B site and stack alternately, resulting in a $MnO_6$—Ca—$AlO_4$ layered staking as illustrated in FIG. 2A. By accepting excess oxygen in the lattice, half tetrahedral $AlO_4$ changes the coordination and becomes octahedral $AlO_6$ in $Ca_2MnAlO_{5.5}$, resulting in a $MnO_6$—Ca—$AlO_4$—Ca—$MnO_6$—Ca—$AlO_6$ stacking order, as shown in FIG. 2B. The octahedral and tetrahedral bonded Al ions are distinguished as $Al\_O_h$ and $Al\_T_d$, respectively. Similarly, Ca between $Al\_O_h$ and Mn layer is named as $Ca\ O_h$ while Ca between $Al\_T_d$ and Mn layer is named as $Ca\_T_d$.

The calculation of the enthalpy and free energy of an oxygen release reaction may be presented as follows:

$$MO_{5.5} \rightarrow MO_5 + 0.25 O_2 \quad (1)$$

where $MO_5$ represents the chemically doped $Ca_2MnAlO_5$ and $MO_{5.5}$ represents $Ca_2MnAlO_{5.5}$. The temperature-dependent Gibbs free energy of reaction 1 is $$\Delta G = (H_{MO_5} - H_{MO_{5.5}}) - T(S_{MO_5} - S_{MO_{5.5}}) + 0.25 G_{O_2} \quad (2)$$

Because the volume change in the solid component is small relative to the volume change associated with releasing gaseous $O_2$, PV contribution due to changes in the volumes of the solid phases can be neglected. The free energy of $O_2$ gas is related to the temperature and pressure as $$G_{O_2}(T,P) = H_{O_2}(T) - TS_{O_2}(T) + kT\ln(P/P^0) \quad (3)$$

Applying a correction for the binding energy of $O_2$, the reaction enthalpy at 300 K is $$\Delta H_{300} \approx E_{MO_5} - E_{MO_{5.5}} + 0.25 E^*_{O_2} \quad (4)$$

At temperature T, the enthalpy is obtained as $$\Delta H(T) = \Delta H_{300} + 0.25 H_{O_2}(T) - 0.25 H_{O_2}(300\ K) \quad (5)$$

The Gibbs free energy becomes $$\Delta G(T) = \Delta H(T) - T(S_{MO_5} - S_{MO_{5.5}}) + 0.25 TS_{O_2}(T) + 0.25 kT\ln(P/P^0) \quad (6)$$

$Ca_2MnAlO_5$ crystallizes in space group Ibm2, while $Ca_2MnAlO_{5.5}$ crystallizes in space group Imma. These structures are used as the initial structure models in DFT relaxations. The structure of $Ca_2MnAlO_{5.5}$ contains half-occupied $Al\_T_d$ and oxygen sites. We first estimate the electrostatic energy for all possible occupancies in a unit cell by assigning formal charges (Ca: +2; Mn: 4+; Al: +3; O: −2) in the Ewald summation, and perform DFT calculations for the structure with lowest electrostatic energy.

DFT calculations were performed using the Vienna ab initio Simulation Package (VASP) with projector augmented waves (PAW) pseudo potentials and the exchange-correlation functional parameterized by Perdew, Burke, and Ernzerhof for the generalized gradient approximation (GGA). To describe the d-part of the Hamiltonian using GGA+U method for 3d transition metal ions a Hubbard type potential was introduced, with the U parameter optimized in reference. A cutoff energy of 500 eV was used with 6×2×6 Gamma centered k-point mesh for the unit cell of $O_5$ phase, and 6×1×6 for the unit cell of $O_{5.5}$ phase. With these settings the numerical convergence was ensured to less than 2 meV per formula unit. In all calculations the relaxation was first performed on the ionic positions and the unit cell size, followed by a self-consistent calculation to obtain the final energy.

TABLE 1

| Lattice parameters of $Ca_2AlMnO_{5+\delta}$ ($\delta$ = 0 and 0.5) | | | | |
|---|---|---|---|---|
| | $Ca_2MnAlO_5$ | | $Ca_2MnAlO_{5.5}$ | |
| | DFT | exp | DFT | exp |
| a (Å) | 5.601 | 5.469 | 5.291 | 5.286 |
| b (Å) | 15.007 | 15.003 | 29.696 | 29.533 |
| c (Å) | 5.337 | 5.243 | 5.451 | 5.403 |
| V (Å³) | 448.6 | 430.1 | 856.6 | 843.4 |

Oxygen storage in $Ca_2MnAlO_5$ Table 1 lists the DFT optimized lattice parameters for $Ca_2AlMnO_5$ and $Ca_2AlMnO_{5.5}$. The unit cell volume is overestimated by 1-4%, which is a common trend for GGA-based calculations.

The reaction enthalpy is 0.417 eV per formula unit (+40.2 kJ/mol) for the reaction $$Ca_2MnAlO_{5.5} \rightarrow Ca_2MnAlO_5 + 0.25 O_2 \quad (11)$$

With this enthalpy value, the temperature for the equilibrium between $O_5$ and $O_{5.5}$ phase is calculated to be 848 K at 1 atm $O_2$ pressure, while various available measurements showed an average value around 878 K. This remarkable agreement verifies DFT calculations used in the study of oxygen storage materials.

In one aspect, the DFT calculations are provided for isovalent doping at Ca, Mn and Al sites. These include the doping of alkaline earth ions (Mg, Sr, Ba) at Ca site, doping of trivalent ions (Ga, Sc and Y) at Al site, and doping of 3d transition metal (Ti to Ni) at Mn site. Table 2 lists the calculated reaction enthalpy and the transition temperature at 1 atm $O_2$ partial pressure.

TABLE 2

Reaction enthalpy ($\Delta H_{300}$, eV) and transition temperature at 1 atm $O_2$ partial pressure ($T_c$, Kelvin) for chemical doped $Ca_2MnAlO_{5+\delta}$.

| site | doping element | $\Delta H_{300}$ | $T_c$ |
|---|---|---|---|
| original | / | 0.417 | 848 |
| Ca | Mg | 0.468 | 964 |
|  | Sr | 0.407 | 827 |
|  | Ba | 0.324 | 641 |
| Al | Ga | 0.465 | 958 |
|  | Sc | 0.354 | 708 |
|  | Y | 0.325 | 644 |
| Mn | Ti | 0.544 | 1121 |
|  | V | 0.530 | 1103 |
|  | Cr | 0.420 | 854 |
|  | Fe | 0.387 | 781 |
|  | Co | 0.364 | 729 |
|  | Ni | 0.242 | 463 |

Alkaline earth ions doping at Ca site. The unit cell of $Ca_2MnAlO_{5.5}$ contains two symmetrically distinct Ca sites, which are distinguished by their distances to $Al\_O_h$ and $Al\_T_d$ layers. DFT calculations reveal that the replacement of Ca with larger Sr or Ba preferably happens at $CaO_h$ site. The doping of Sr and Ba at $Ca\_T_d$ site is energetically unstable by 0.81 and 1.23 eV, respectively. On the contrary, doping of Mg is more stable at $Ca\_T_d$ site, while the energy of the configuration with Mg at $Ca\_O_h$ site is 0.82 eV higher.

Figure 6:
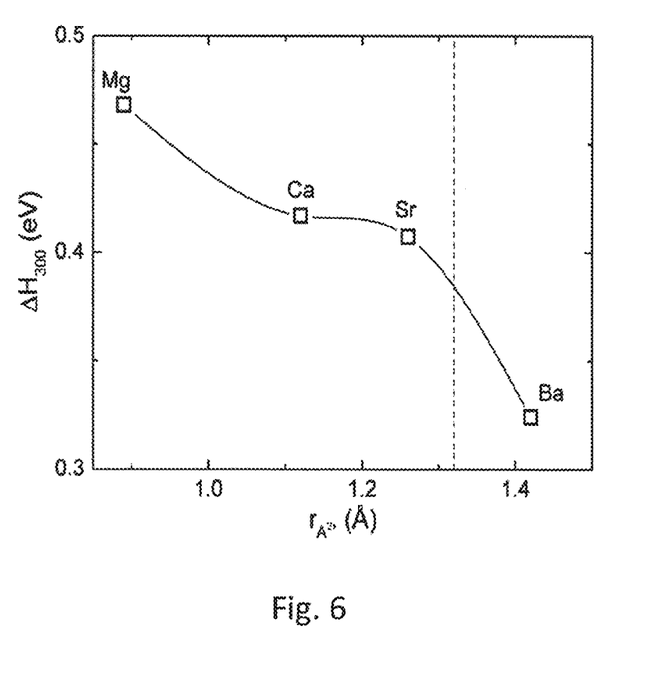
FIG. 6. is a plot of oxygen release enthalpy at 300 K for alkaline earth doped Ca$_2$MnAlO5.5 as a function of the radius of alkaline ions.

It can be seen from Table 2 that the size of the dopant at Ca site also greatly affects the reaction enthalpy. Doping large alkaline earth ions leads to decrease in the reaction enthalpy thus providing a lower transition temperature. The lattice expansion caused by the replacement of Ca with larger alkaline earth ions weakens the oxygen bonding strength; therefore the release of oxygen is energetically easier for a larger dopant. To quantitatively illustrate this trend, in FIG. 6 the reaction enthalpy is plotted against the relaxed alkaline earth-oxygen bond distances. The large alkaline earth-oxygen bond length leads to lower reaction enthalpy. From Mg to Sr, the reaction enthalpy gradually decreases by 0.07 eV. Accordingly, doping Mg increases the transition temperature by ~120 K, while doping Sr slightly decreases the transition temperature. The decrease of reaction enthalpy is more obvious for Ba doping. For an ideal perovskite $ABO_3$ structure the bond lengths satisfy $r_A+r_o=\sqrt{2}(r_b+r_o)$. For the oxygen rich phase the ideal radius at A site is estimated to be 1.32 Å, which is far below the ionic size of $Ba^{2+}$ (1.42 Å). Therefore the doping of large Ba ions destabilizes the oxygen rich phase. As a result the reaction enthalpy quickly drops by 0.17 eV from Sr doping to Ba doping. The transition temperature for Ba doped $Ca_2MnAlO_{5+\delta}$ drops by 200 K compared to the un-doped compound.

Figure 3:
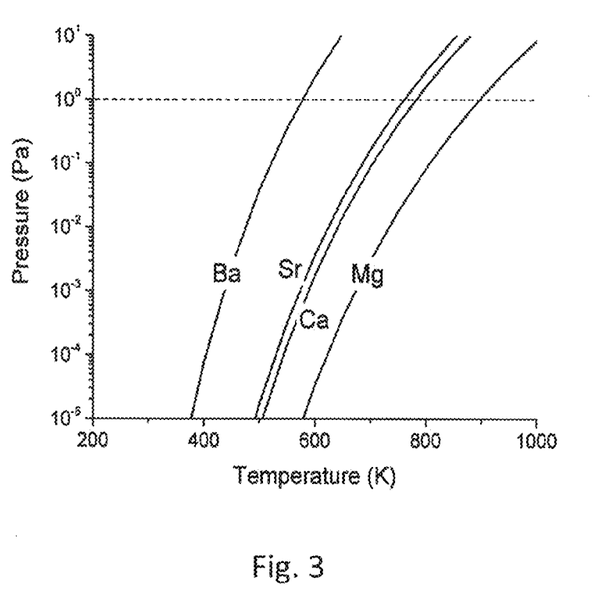
FIG. 3 is a plot of the temperature dependent equilibrium pressure between Ca$_{31/16}$X$_{1/16}$MnAlO$_{5.5}$ and Ca$_{31/16}$X$_{1/16}$MnAlO$_5$ with X=Mg, Ca, Sr, Ba.

Referring to FIG. 3, there are shown equilibrium plots for $Ca_2AlMnO_{5+\delta}$ and for the doped species of the material including alkaline earth ions such as Mg, Sr and Ba. As can be seen in the plots, doping various divalent ions into the material changes the temperature and pressure profiles of the material allowing the use of such materials in differing reactions that may outside of a specified temperature window of the un-doped material.

Trivalent ions doping at Al site. The unit cell of $Ca_2MnAlO_{5.5}$ contains two symmetry distinct Al sites bonded in octahedral and tetrahedral environment. DFT calculations showed that the doping of Ga at $Al\_O_h$ site is more stable by 0.13 eV, which implies the preference of Ga to stay with octahedral bonding. As a consequence of this site preference, the replacement of Al by Ga destabilizes the reduced phase, in which the doped Ga has to stay at tetrahedral environment. The reaction enthalpy is increased by ~0.10 eV and the transition temperature is increased by ~110 K.

The doping of even larger trivalent Sc and Y is also presented. The ionic sizes of $Sc^{3+}$ (0.87 Å) and $Y^{3+}$ (0.90 Å) are 63% and 68% larger than that of $Al^{3+}$ (0.535 Å). The large size mismatch destabilizes the doped compound, especially for the oxidized $O_{5.5}$ phase, whose unit cell size is smaller than the reduced $O_5$ phase. As a result, the doping of Sc and Y lowers the transition temperature by approximately 140 and 204 K, respectively.

Figure 4:
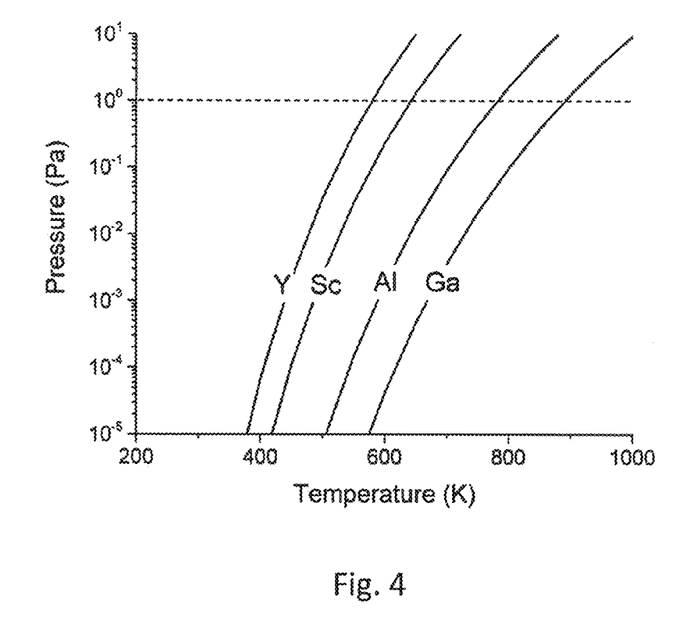
FIG. 4 is a plot of the temperature dependent equilibrium pressure between Ca$_2$MnAl$_{7/8}$X$_{1/8}$O$_{5.5}$ and Ca$_2$MnAl$_{7/8}$X$_{1/8}$O$_5$ with X=Al, Ga, Sc.

Referring to FIG. 4, there are shown equilibrium plots for $Ca_2AlMnO_{5+\delta}$ and for the doped species of the material including trivalent ions such as Ga, Sc, and Y. As can be seen in the plots, doping various trivalent ions into the material changes the temperature and pressure profiles of the material allowing the use of such materials in differing reactions that may outside of a specified temperature window of the un-doped material.

3d transition metal doping at Mn site. The release of oxygen from $Ca_2MnAlO_{5.5}$ requires the distribution of one extra electron on the lattice. The function of Mn is to provide an active redox center that tunes the valence to balance the charge transfer. Therefore the redox potential of the transition metal ions directly affects the reaction enthalpy. In Table 2, the reaction enthalpy generally decreases from early 3d transition metals (Ti and V) to late transition metals (Co and Ni). Compared to the un-doped $Ca_2MnAlO_{5+\delta}$, the doping of 12.5% of Ti and V increases the transition temperature by approximately 273 and 255 K, respectively. On the contrary, the doping of 12.5% of Fe, Co and Ni decreases the transition temperature by approximately 67, 119, 205 K, respectively.

Figure 7:
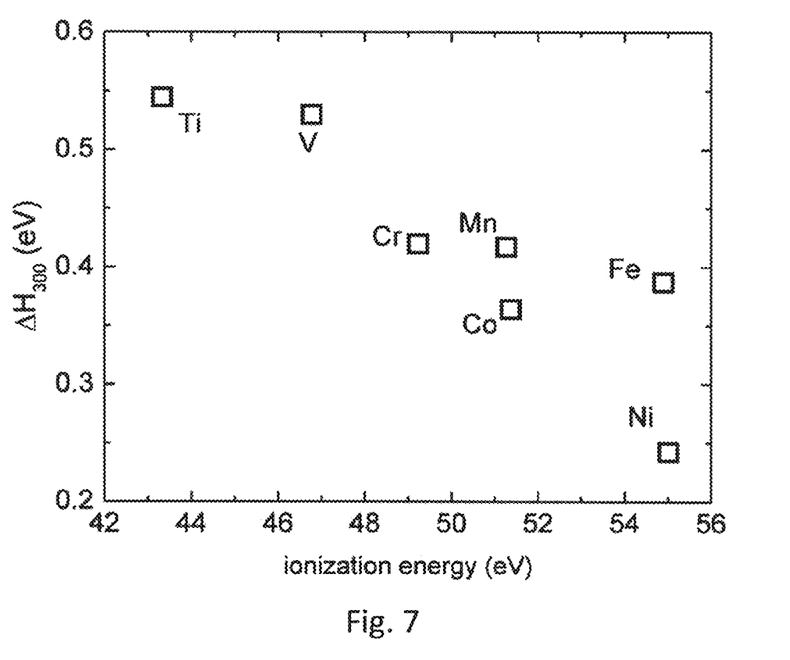
FIG. 7. is a plot of enthalpy to release oxygen from 3d transition metal doped Ca$_2$MnAlO5.5 vs ionization energy of the transition metal from 3+ to 4+ oxidation state.

The stability of oxygen vacancy in transition metal doped compounds may be affected by the degree of covalency of transition metal-oxygen bond. Oxygen ions are easy to remove when the electrons are less localized in a relatively more covalent bond. However, the oxygen ions released from $Ca_2MnAlO_{5.5}$ does not bond directly to the transition metal ions. Therefore it is the transition metal redox potential instead of the transition metal-oxygen bond strength that directly affects the oxygen vacancy stability. The release of oxygen may be described as the cleavage of the bonding of the target oxygen ions and concurrent formal reduction of the transition metal ions from transition metal$^{4+}$ to transition metal$^{3+}$. The reaction enthalpy of these processes can be correlated to the transition metal cation reduction exothermicities. Transition metal$^{3+}$ ionization potentials nicely correlate the computed reaction enthalpy as shown in FIG. 7. Transition metal$^{3+}$ ions with larger IPs exhibit higher $\Delta H$ values, indicating they are more reluctant to be oxidized. The only ion that seems to deviate from this general trend is $Fe^{3+}$. This is probably because $Fe^{4+}$ can be better stabilized in certain perovskite structures. As a result, the reaction enthalpy for Fe doped compound is less than expected.

Figure 5:
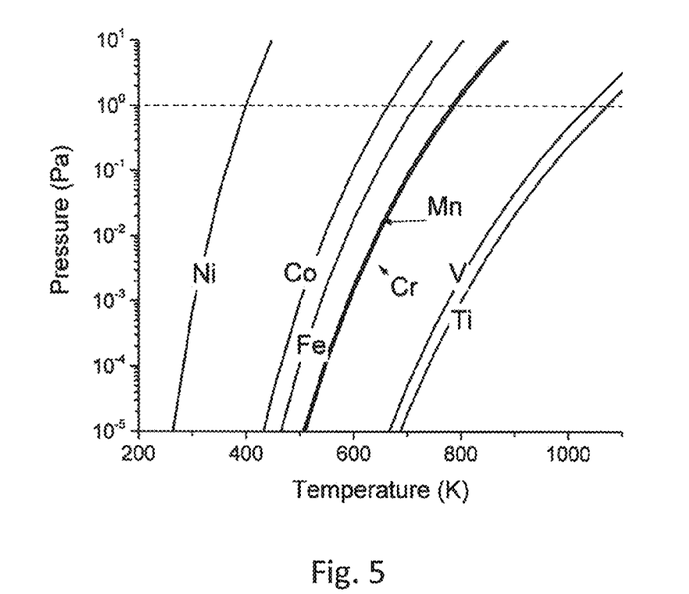
FIG. 5. Is a plot of the temperature dependent equilibrium pressure between Ca$_2$Mn$_{7/8}$X$_{1/8}$AlO$_{5.5}$ and Ca$_2$Mn$_{7/8}$X$_{1/8}$AlO$_5$ with X=Ti, V, Cr, Mn, Fe, Co, Ni.

Referring to FIG. 5, there are shown equilibrium plots for $Ca_2AlMnO_{5+\delta}$ and for the doped species of the material including transition metal ions such as Ti, V, Cr, Fe, Co and Ni. As can be seen in the plots, doping various transition metal ions into the material changes the temperature and pressure profiles of the material allowing the use of such materials in differing reactions that may outside of a specified temperature window of the un-doped material.

Figure 8:
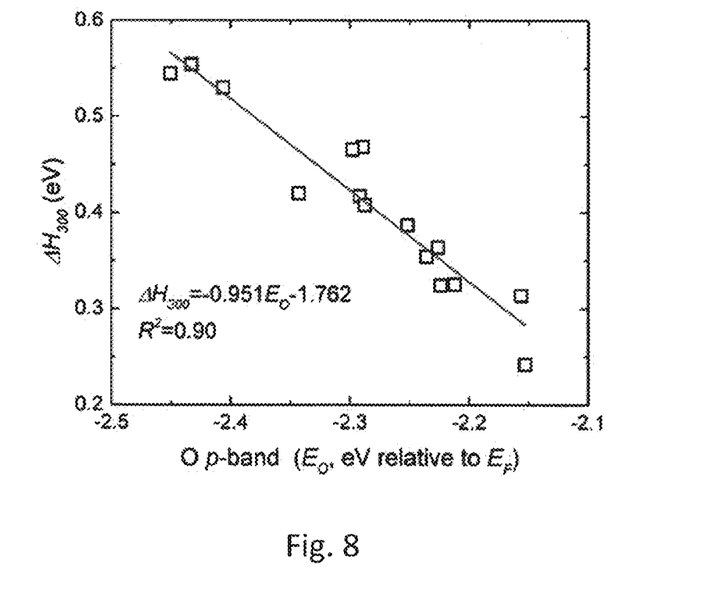
FIG. 8 is a plot of the correlation between the oxygen p-band center relative to the Fermi level and the enthalpy to release oxygen from doped Ca$_2$MnAlO$_{5.5}$.

The property for oxygen release in $Ca_2MnAlO_{5.5}$ is well correlated to the p-band position of released oxygen. FIG. 8 shows the reaction enthalpy as a function of oxygen p-band center for the chemical doped $Ca_2MnAlO_{5.5}$. Remarkably, the reaction enthalpy linearly decreases with oxygen p-band center relative to the Fermi level. Higher oxygen p-band position leads to lower reaction enthalpy, implying easier release of oxygen from the oxidized phase. This trend can be interpreted as the energy required removing an electron from $O^{2-}$ decreases as oxygen p-band gets closer to the Fermi level. The reaction of (1) oxidizes half $O^{2-}$, thus moves one electron from the host oxide. The fitted reaction enthalpy vs p-band center curve has a slope of −0.951, which closely corresponds to the theoretical value (−1.0). The nice correlation presented in FIG. 8 indicates the desirability to tune the relative position of O p-band to the Fermi level to create desirable oxygen storage material to meet the requirement of different reactions.

In another aspect an oxygen storage material may have formula: $Ca_2MnAlO_{5+\delta}$ wherein 0≤δ<0.5 wherein the compound includes two dopants said dopants selected from alkaline earth ions at the Ca site, trivalent ions at the Al site, and 3d transition metal ions at the Mn site wherein the an oxygen release temperature or an oxygen storage temperature is modified in comparison to an un-doped $Ca2MnAlO5_{+\delta}$ material.

The two dopants may exhibit a similar effect on the release temperature of the material. For example, as described above with reference to the various dopants Ba and Fe both demonstrate the ability to lower the transition temperature. Similarly both Ti and Ga demonstrate the ability to increase the transition temperature. Reaction enthalpy ($\Delta H_{300}$, eV) and transition temperature at 1 atm $O_2$ partial pressure ($T_c$, Kelvin) for $Ca_2MnAlO_{5+\delta}$ co-doped with two elements are provided in Table 3.

The co-doping of Ba and Fe further lowers the reaction enthalpy as well as the transition T, and the co-doping of Ti/Ga further increases the enthalpy and transition temperature. However, it is also noticed that the enthalpy change caused by the co-doping is slightly less than the sum of the enthalpy change caused by the doping of the single elements as was presented above.

TABLE 3

| element 1 | element 2 | $\Delta H_{300}$ | $T_c$ |
|---|---|---|---|
| Ba | Fe | .314 | 618 |
| Ga | Ti | .554 | 1131 |

The invention is not restricted to the illustrative examples described above. Examples described are not intended to limit the scope of the invention. Changes therein, other combinations of elements, and other uses will occur to those skilled in the art. The scope of the invention is defined by the scope of the claims.

Having described our invention, We claim:

1. An oxygen storage material comprising:
a compound of the formula: $Ca_2MnAlO_{5+\delta}$ wherein 0≤δ≤0.5
wherein the compound includes at least one dopant said dopant selected from alkaline earth ions at the Ca site, trivalent ions at the Al site, and 3d transition metal ions at the Mn site wherein the an oxygen release temperature or an oxygen storage temperature is modified in comparison to an un-doped $Ca_2MnAlO_{5+\delta}$ material.

2. The oxygen storage material of claim 1 wherein the dopant is present in an amount of from 6 to 13 molar percent.

3. The oxygen storage material of claim 1 wherein the alkaline earth ions are selected from Mg, Sr and Ba.

4. The oxygen storage material of claim 3 wherein the alkaline earth ion is Mg and the release temperature is increased in comparison to an un-doped $Ca_2MnAlO_{5+\delta}$ material.

5. The oxygen storage material of claim 3 wherein the alkaline earth ion is Sr or Ba and the release temperature is decreased in comparison to an un-doped $Ca_2MnAlO_{5+\delta}$ material.

6. The oxygen storage material of claim 1 wherein the trivalent ions are selected from Ga, Sc, and Y.

7. The oxygen storage material of claim 6 wherein the trivalent ion is Ga and the release temperature is increased in comparison to an un-doped $Ca_2MnAlO_{5+\delta}$ material.

8. The oxygen storage material of claim 6 wherein the trivalent ion is Sc or Y and the release temperature is decreased in comparison to an un-doped $Ca_2MnAlO_{5+\delta}$ material.

9. The oxygen storage material of claim 1 wherein the 3d transition metal ions are selected from Ti, V, Cr, Fe, Co and Ni.

10. The oxygen storage material of claim 9 wherein the 3d transition metal ion is Fe or Co or Ni and the release temperature is decreased in comparison to an un-doped $Ca_2MnAlO_{5+\delta}$ material.

11. The oxygen storage material of claim 9 wherein the 3d transition metal ion is Ti or V and the release temperature is increased in comparison to an un-doped $Ca_2MnAlO_{5+\delta}$ material.

12. The oxygen storage material of claim 1 wherein the at least one dopant includes two dopants.

13. The oxygen storage material of claim 12 wherein the two dopants are doped at differing sites of the Ca, Mn and Al sites.

14. An oxygen storage material comprising:
a compound of the formula: $Ca_2MnAlO_{5+\delta}$ wherein 0≤δ≤0.5
wherein the compound includes at least one dopant said dopant selected from alkaline earth ions at the Ca site, trivalent ions at the Al site, and 3d transition metal ions at the Mn site wherein the an oxygen release temperature is increased in comparison to an un-doped $Ca_2MnAlO_{5+\delta}$ material.

15. The oxygen storage material of claim 14 wherein the at least one dopant is selected from the group wherein the 3d transition metal ion is Ti or V, the trivalent ion is Ga, and the alkaline earth ion is Mg.

16. An oxygen storage material comprising:
a compound of the formula: $Ca_2MnAlO_{5+\delta}$ wherein 0≤δ≤0.5
wherein the compound includes at least one dopant said dopant selected from alkaline earth ions at the Ca site, trivalent ions at the Al site, and 3d transition metal ions at the Mn site wherein the an oxygen release temperature is decreased in comparison to an un-doped $Ca_2MnAlO_{5+\delta}$ material.

17. The oxygen storage material of claim 16 wherein the at least one dopant is selected from the group wherein the 3d transition metal ion is the 3d transition metal ion is Fe or Co or Ni, the trivalent ion is Sc or Y, and the alkaline earth ion is Sr or Ba.

18. An oxygen storage material comprising:
a compound of the formula: $Ca_2MnAlO_{5+\delta}$ wherein $0 \leq \delta \leq 0.5$
wherein the compound includes two dopants said dopants selected from alkaline earth ions at the Ca site, trivalent ions at the Al site, and 3d transition metal ions at the Mn site wherein the an oxygen release temperature or an oxygen storage temperature is modified in comparison to an un-doped $Ca_2MnAlO_{5+\delta}$ material.

19. The oxygen storage material of claim 18 wherein the alkaline earth ions are selected from Mg, Sr and Ba.

20. The oxygen storage material of claim 18 wherein the trivalent ions are selected from Ga, Sc, and Y.

21. The oxygen storage material of claim 18 wherein the 3d transition metal ions are selected from Ti, V, Cr, Fe, Co and Ni.

* * * * *